United States Patent
Anderson et al.

(10) Patent No.: US 10,348,605 B2
(45) Date of Patent: Jul. 9, 2019

(54) EMBEDDING ANALYZER FUNCTIONALITY IN STORAGE DEVICES

(71) Applicant: Western Digital Technologies, Inc., Irvine, CA (US)

(72) Inventors: Thomas Patrick Anderson, Costa Mesa, CA (US); Jeerun Chan, Fountain Valley, CA (US); Caesar Cheuk-Chow Cheung, Irvine, CA (US); Daniel Lee Ellis, Canyon, CA (US); Michael Harvill, Orange, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 272 days.

(21) Appl. No.: 15/337,715

(22) Filed: Oct. 28, 2016

(65) Prior Publication Data
US 2018/0123936 A1    May 3, 2018

(51) Int. Cl.
*G06F 15/16* (2006.01)
*H04L 12/26* (2006.01)
(Continued)

(52) U.S. Cl.
CPC .............. *H04L 43/18* (2013.01); *G06F 11/30* (2013.01); *H04L 43/028* (2013.01); *H04L 43/08* (2013.01); *H04L 43/16* (2013.01); *H04L 67/1097* (2013.01)

(58) Field of Classification Search
CPC ....... H04L 43/028; H04L 43/08; H04L 43/16; H04L 43/18; H04L 67/2804; H04L 67/1097; H04L 11/30
See application file for complete search history.

(56) References Cited

U.S. PATENT DOCUMENTS 6,981,113 B2 * 12/2005 McDonnell ......... G06F 9/30123
                                                  711/156
6,986,007 B1 * 1/2006 Procyk ................ G11B 27/105
                                                  369/30.03
(Continued)

FOREIGN PATENT DOCUMENTS

CN          102495920 B      6/2014

OTHER PUBLICATIONS

Schoenecker, "Successfully addressing PCIe protocol validation challenges" Embedded Computing Design, Retrieved on Jun. 24, 2016 from http://embedded-computing.com/articles/successfully-addressing-pcie-protocol-validation-challenges/, 6 pgs.
(Continued)

*Primary Examiner* — Moustafa M Meky
*Assistant Examiner* — Thorne E Waugh
(74) *Attorney, Agent, or Firm* — Arent Fox LLP (57) ABSTRACT

A method includes receiving, at an interface of a storage device and from a host device, an electrical signal representative of data. The storage device includes a mass storage device. The method also includes splitting, at the interface, the electrical signal representative of the data into a first data stream and a second data stream, wherein the first data stream is identical to the second data stream. The method also includes sending, from the interface and to a controller of the storage device, the first data stream; and sending, from the interface and to an analyzer integrated within the storage device, the second data stream. The method further includes filtering, by the analyzer, the second data stream to generate debugging data; and sending, by the analyzer and to the host device, at least a portion of the debugging data.

20 Claims, 5 Drawing Sheets

(51) Int. Cl.
    *G06F 11/30*     (2006.01)
    *H04L 29/08*     (2006.01)

(56) References Cited

U.S. PATENT DOCUMENTS

| | | | |
|---|---|---|---|
| 8,688,926 B2* | 4/2014 | Breakstone | G06F 1/30 |
| | | | 711/154 |
| 8,738,818 B2 | 5/2014 | Mahajan | |
| 8,843,895 B2* | 9/2014 | McFadden | G06F 9/45516 |
| | | | 717/100 |
| 9,053,343 B1* | 6/2015 | Fuller | G06F 21/6263 |
| 9,148,352 B2 | 9/2015 | Manula et al. | |
| 9,946,478 B2* | 4/2018 | Tan | G06F 3/0619 |
| 9,971,675 B2* | 5/2018 | Lincoln | G06F 11/3664 |
| 10,031,691 B2* | 7/2018 | Doerk | G06F 3/0641 |
| 2011/0083061 A1* | 4/2011 | Grube | G06F 11/1092 |
| | | | 714/776 |
| 2013/0058207 A1 | 3/2013 | Kobayashi | |
| 2018/0004413 A1* | 1/2018 | Zhang | G06F 3/061 |

OTHER PUBLICATIONS

Tektronix PCI Express Logic Protocol Analyzer, TLA7SA00 Series Datasheet, www.tek.com, Apr. 19, 2016, 12 pgs.

Lecklider, "Traveling in the PCI Express Lane", Evaluation Engineering, Jun. 2005, Retrieved from http://www.evaluationengineering.com/articles/200506/traveling-in-the-pci-express-lane.php, 5 pgs.

Tektronix, A Complete Solution for Physical through Protocol Layer Debug, TLA7SA00 Logic Protocol Analyzer for PCI Express, Retrieved on Jun. 28, 2016 from http://www.tek.com/protocol-analyzer/tla7sa00 , 2 pgs.

UltraSoC announces industry-first "debug over USB" capability for complex SoCs, Aug. 21, 2015, Retrieved from http://www.ultrasoc.com/ultrasoc-announces-industry-first-debug-over-usb-capability-for-complex-socs/, 3 pgs.

* cited by examiner

EMBEDDING ANALYZER FUNCTIONALITY IN STORAGE DEVICES

TECHNICAL FIELD

The disclosure generally relates to storage devices.

BACKGROUND

A host device may exchange data with a storage device via an interface protocol such as Peripheral Component Interconnect Express (PCIe®) or Non-Volatile Memory Express (NVMe™) via PCIe®. To facilitate development of storage devices, such as in the context of enterprise network attached storage (NAS) or enterprise data centers, developers, administrators, or other operators may utilize a tool referred to as an "analyzer" to inspect or otherwise gather data regarding the exchange of data via the interface protocols. The analyzer may parse the commands sent via the interface protocol to reveal inefficiencies, errors, or other issues occurring between the host device and the storage devices. These operators may reconfigure the host device and/or the storage device operation to correct for the inefficiencies, errors, or other issues.

SUMMARY

In one example, a method includes receiving, at an interface of a storage device and from a host device, an electrical signal representative of data, wherein the storage device comprises a mass storage device; splitting, at the interface, the electrical signal representative of the data into a first data stream and a second data stream, wherein the first data stream is identical to the second data stream; sending, from the interface and to a controller of the storage device, the first data stream; sending, from the interface and to an analyzer integrated within the storage device, the second data stream; filtering, by the analyzer, the second data stream to generate debugging data; sending, by the analyzer and to the host device, at least a portion of the debugging data.

In another example, a data storage device includes a mass storage device, a controller, an interface, and an analyzer. The controller is configured to manage read operations from the mass storage device and write operations to the mass storage device. The interface includes at least one signal splitter configured to receive, from a host device, an electrical signal representative of data and split the electrical signal representative of the data into a first data stream and a second data stream, wherein the first data stream is identical to the second data stream. The signal splitter is also configured to send, to the controller, the first data stream; and send, to the analyzer, the second data stream. The analyzer is configured to filter the second data stream to generate debugging data; and send, to the host device via the interface, at least a portion of the debugging data.

In another example, an endpoint device includes a controller, an interface, and an analyzer. The interface includes a signal splitter is configured to receive, from a host device, an electrical signal representative of data. The signal splitter is also configured to split the electrical signal representative of the data into a first data stream and a second data stream, wherein the first data stream is identical to the second data stream. The signal splitter is further configured to send, to the controller, the first data stream; and send, to the analyzer, the second data stream. The analyzer is configured to filter the second data stream to generate debugging data; and send, to the host device via the interface, at least a portion of the debugging data.

The details of one or more examples are set forth in the accompanying drawings and the description below. Other features, objects, and advantages will be apparent from the description and drawings, and from the claims.

DETAILED DESCRIPTION

In general, this disclosure describes techniques for analyzing data transferred between a host device and a storage device. In contrast to examples where an interposer card is inserted between the host device and the storage device in order to capture data and send the data to an analyzer, techniques of this disclosure may enable a storage device to analyze data transferred between the host device and the storage device. For example, the storage device may receive, via an interface, an electrical signal representative of data and may split the electrical signal into two electrical signals representative of two identical or nearly identical data streams. The interface may be directly coupled to a controller of the storage device, such that the first electrical signal may be transmitted to the controller without, or with minimal, disruption. Thus, the controller may receive the first electrical signal representative of a first data stream and process the first electrical signal to perform read and write commands. The second electrical signal representative of a second data stream may be transmitted to an analyzer integrated within the storage device. The analyzer may filter the second data stream to generate debugging data and may send the debugging data to the host device.

In this respect, the techniques of this disclosure may enable a storage device to split an electrical signal representative of data without breaking a physical connection between a host device and a storage device. In contrast to some examples that break the connection between the host device and storage device using an interposer card with complicated and expensive circuits to maintain electrical signal integrity, splitting the electrical signal at the interface may enable the storage device to analyze the data represented by the electrical signal while potentially minimizing any disruption of the electrical signal between the host device and the storage device at relatively low cost (e.g., compared to using interposer cards). integrating an analyzer into the storage device may, in contrast to examples where an interposer card and analyzer are inserted between the host device and storage device after an error occurs, enable the analyzer to output debugging data in real time rather than requiring a user to attempt to recreate the operating conditions that caused the error. By filtering the second data stream, the analyzer may reduce the amount of debug data transmitted back to the host device, which may reduce the bandwidth impact that may result in portioning bandwidth reserved for data transmission to be used for transmission of debug data. The analyzer may also append data associated with the storage device to the debugging data. By adding data associated with the storage device to the debugging data, the analyzer may provide a user with information about the storage device in addition to information about the data transfer.

Figure 1:
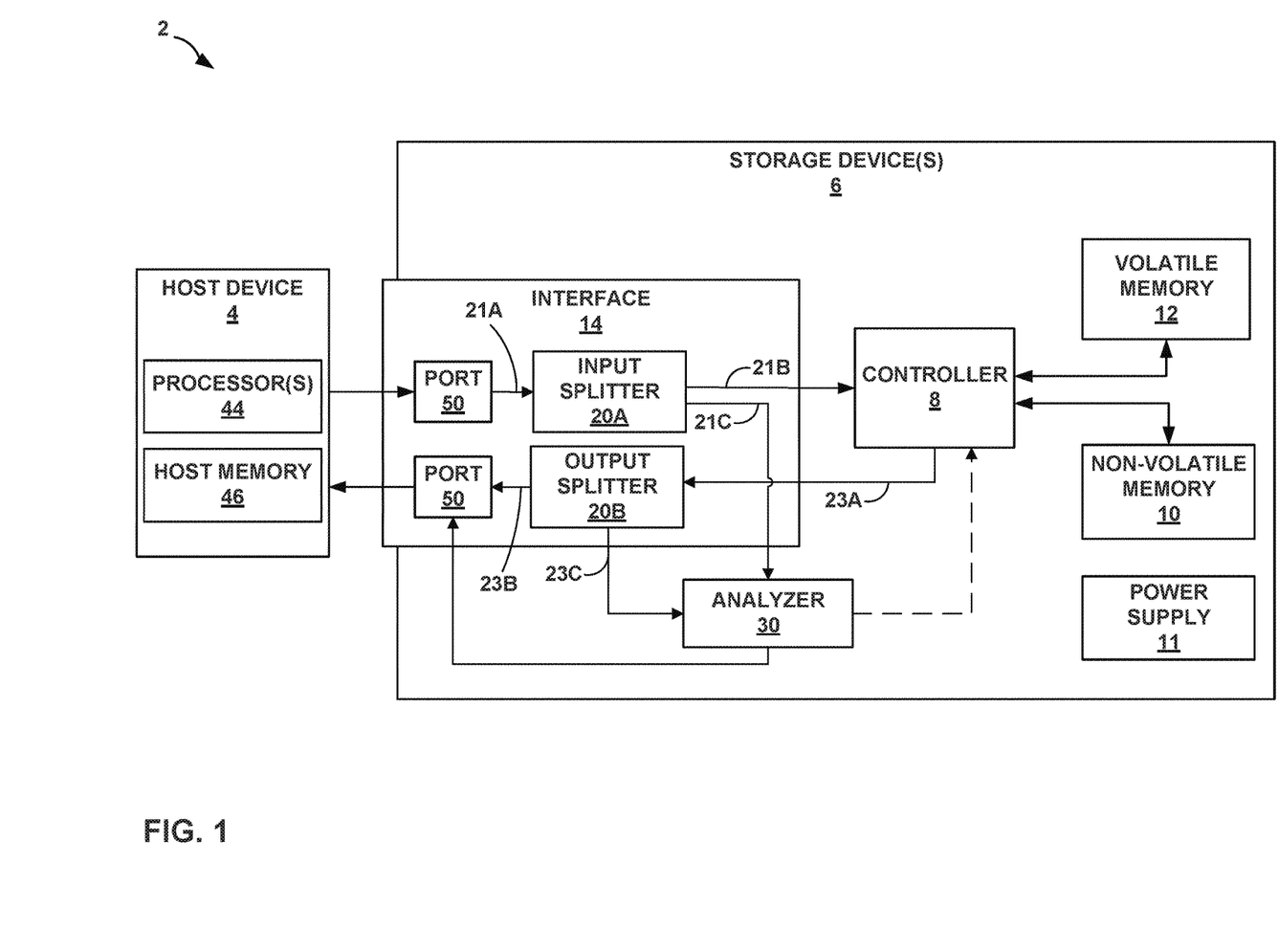
FIG. 1 is a conceptual and schematic block diagram illustrating an example storage environment in which a storage device may function as a storage device for a host device and may analyze data transferred between the storage device and the host device, in accordance with one or more techniques of this disclosure.

FIG. 1 is a conceptual and schematic block diagram illustrating an example storage environment 2 in which storage device 6 may function as a storage device for host device 4 and may analyze data transferred between storage device 6 and host device 4, in accordance with one or more techniques of this disclosure. For instance, host device 4 may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 44 and host memory 46. The at least one processor 44 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 46 may be used by host device 4 to store data (e.g., temporarily store data). In some examples, host memory 46 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, non-volatile memory 10 (NVM 10), power supply 11, volatile memory 12, interface 14, and analyzer 30. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, Peripheral Component Interconnect (PCI®), PCI-extended (PCI-X®), PCI Express (PCIe®) (e.g., PCIe® x1, x4, x8, x16, PCIe® Mini Card, MiniPCI®, etc.), M.2, U.2, or the like. In some examples, storage device 6 may be directly coupled (e.g., directly soldered) to a motherboard of host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 may include volatile memory 12, which may be used by controller 8 to store data. In some examples, controller 8 may use volatile memory 12 as a cache. For instance, controller 8 may store cached data in volatile memory 12 until the cached data is written NVM 10. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 may include NVM 10, which may include a plurality of memory devices. NVM 10 may be configured to store and/or retrieve data. For instance, a memory device of NVM 10 may receive data and a message from controller 8 that instructs the memory device to store the data. Similarly, the memory device of NVM 10 may receive a message from controller 8 that instructs the memory device to retrieve data. In some examples, each of the memory devices may be referred to as a die. In some examples, a single physical chip may include a plurality of dies (i.e., a plurality of memory devices). In some examples, NVM 10 may include a mass storage device that is configured to store relatively large amounts of data (e.g., 1 GB, 4 GB, 16 GB, 64 GB, 256 GB, 512 GB, 1 TB, etc.). NVM 10 may include any type of non-volatile memory devices, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices.

Storage device 6 includes controller 8, which may manage one or more operations of storage device 6. For instance, controller 8 may manage the reading of data from and/or the writing of data to NVM 10. Controller 8 may represent one of or a combination of one or more of a microprocessor, digital electrical signal processor (DSP), application specific integrated circuit (ASIC), field programmable gate array (FPGA), or other digital logic circuitry.

Storage device 6 includes interface 14 for interfacing with host device 4. Interface 14 may include one or both of a data bus for exchanging data with host device 4 and a control bus for exchanging commands with host device 4. As illustrated in NG. 1, interface 14 operates according to a peripheral component interconnect express (PCIe®) protocol. In some examples, example, interface 14 may operate according to a high level protocol operating over a low level protocol. For instance, the low level protocol may include a PCI® or PCIe® protocol and the high level protocol may include the Non-Volatile Memory Express (NVMe™) protocol. In other instances, the high level protocol may include Advanced Host Controller Interface (AHCI), SCSI over PCIe® (SOP), PCIe® Queuing Interface (PQI), or any other high level protocol that is built on top of a low level (e.g., PCIe®) protocol. In still other examples, interface 14 may operate in accordance with any suitable protocol, such as advanced technology attachment (ATA) (e.g., serial-ATA (SATA), and parallel-ATA (PATH)), Fibre Channel, small computer system interface (SCSI), serially attached SCSI (SAS), peripheral component interconnect (PCI®), or the like. Interface 14 (e.g., the data bus, the control bus, or both) may be electrically connected to controller 8, providing a communication channel between host device 4 and controller 8, allowing data to be transferred between host device 4 and controller 8. In some examples, the electrical connection of interface 14 may also permit storage device 6 to receive power from host device 4.

As described above, a host device may exchange data with a storage device. To exchange data with the storage device, the host device may transmit an electrical signal representative of the data to the storage device via an interface. Given the growing complexity of interfaces (in terms of bandwidth, operational support or both), it may be necessary to properly configure the host device to interface with the storage device. In order to troubleshoot operation of the host device relative to the storage device, a developer, technician, administrator or other user may utilize an analyzer to inspect communications via the interface between the host device and the storage device.

In some examples, an interposer card may be electrically positioned between the host device and the storage device, which is then coupled to an analyzer. The analyzer may support multiple interposer cards, thereby leveraging the analyzer across multiple interfaces. As the host device and storage device exchange data (via an electrical signal), the interposer card may intercept the electrical signal representative of the data as the electrical signal is transferred between the host device and the storage device.

The interposer card may send a copy of the electrical signal representative of the data to the analyzer, which may analyze the data transfer. Using an interposer card may, however, break the connection between the host device and the storage device, and may also require complicated and costly circuits to maintain the integrity of the electrical signal transferred between the host device and the storage device. In some instances, interposer cards may not physically fit in the storage environment without physically reconfiguring the storage environment, which may impact the ability to reproduce the issue being investigated. Further, interposer cards and analyzers are typically inserted between the host device and storage device after an issue arises, which may require a user to attempt to recreate the conditions that existed at the time the issue arose.

In accordance with examples of this disclosure, storage device 6 may include an analyzer 30 as an integrated component within storage device 6 that analyzes data transfers between host device 4 and storage device 6 without breaking the electrical connection between host device 4 and storage device 6. As described above, host device 4 and storage device 6 may transfer data to one another by sending and receiving electrical signals representative of data. In some examples, interface 14 of storage device 6 may include at least one electrical signal splitter, which may enable interface 14 to split an electrical signal representative of data into a plurality of identical data streams, where each data stream includes data represented by the electrical signal.

For example, as illustrated in FIG. 1, interface 14 includes input splitter 20A and output splitter 20B (collectively, "splitters 20"). Each splitter of splitters 20 may receive an electrical signal representative of data, split the electrical signal into a plurality of electrical signals, and output a plurality of identical data streams represented by the plurality of electrical signals. For instance, storage device 6 may receive, from host device 4, an electrical signal 21A representative of data at interface 14. Input splitter 20A may receive the electrical signal 21A from host device 4 via port 50 and may split the electrical signal 21A representative of data into a first data stream 21B and a second data stream 21B that are identical to one another. Input splitter 20A may output the first data stream 21B to controller 8 and may output the second data stream 21C to analyzer 30. In other words, controller 8 and analyzer 30 may each receive the data sent by host device 4. Controller 8 of storage device 6 may also send an electrical signal representative of data to host device 4 via interface 14. For instance, controller 8 may output an electrical signal 23A representative of data. Output splitter 20B of interface 14 may receive the electrical signal 23A from controller 8 and may split the electrical signal into a plurality of data streams that are identical to one another. For example, output splitter 20B may output a third data stream 23B to host device 4 via port 50 and may output a fourth data stream 23C to analyzer 30.

Storage device 6 may include analyzer 30, which may receive a data stream (from either the input splitter 20A or output splitter 20B), filter the received data stream to generate debugging data, and send the debugging data to host device 4 in order to assist a developer, technician, or other user when debugging a data transfer between host device 4 and storage device 6. The functionality of analyzer 30 may be implemented in hardware, firmware, software, or a combination thereof.

Analyzer 30 may receive a data stream from either the input splitter 20A or output splitter 20B and may filter the received data stream in order to generate debugging data. In some examples, the received data stream may include a plurality of data packets. In some examples, analyzer 30 may filter the data by capturing certain types of data packets (e.g., transaction layer packets (TLPs), data link layer packets (DLLPs), ordered sets, etc.). A TLP includes a packet of user data generated at a transaction layer in the PCIe® protocol. Similarly, a DLLP include a packet of traffic control data generated by a data link layer of in the PCIe® protocol for managing the transmission of TLPs. Further, ordered sets include low-level packets generated and disassembled by the physical layer of an interface for testing the connection between host device 4 and storage device 6. Analyzer 30 may filter the received data stream by capturing only certain portions of a data stream packet (e.g., header data, such as command type, requester ID, packet length, payload length, etc.).

Analyzer 30 may filter the data stream based on a set of one or more criterion. In some instances, the set of one or more criterion may be predetermined. In other words, the criterion may be hardcoded. In other instances, the set of one or more criterion may be received by storage device 6 from host device 4. For instance, host device 4 may specify a set of one or more criteria and may send the set of one or more criterion to storage device 6, In some examples, the set of one or more criterion may be stored in memory, such as cache 38 from FIG. 2, NVM 10, or volatile memory 12.

In response to filtering the received data stream to generate debugging data, analyzer 30 may append additional data to the debugging data. In some examples, analyzer 30 may append, to the debugging data, metadata associated with the data stream received by analyzer 30 (and hence, metadata associated with a data transfer from host device 4 to storage device 6 or a data transfer from storage device 6 to host device 4). For example, analyzer 30 may append a timestamp corresponding to a time at which the data stream was received at analyzer 30, a source identifier indicating a source (e.g., host device 4 or controller 8) of the electrical signal representative of the data stream received by analyzer 30, a port identifier indicating a port of interface 14 to use when sending the debugging data to host device 4, or any other type of data associated with a data transfer between host device 4 and storage device 6.

In some examples, analyzer 30 may append data associated with storage device 6 to the debugging data. For example, analyzer 30 may append data about the state of storage device 6 at the time the data stream was received by analyzer 30, which may correspond to a time that the electrical signal indicative of the data was received at interface 14. In some instances, the data about the state of storage device 6 may include a status identifier that indicates whether storage device 6 was performing internal operations (e.g., garbage collection, wear leveling, etc.) when the data stream was received at analyzer 30, an operations identifier that indicates which internal operations were being performed when the data stream was received at analyzer 30, an indication of a temperature of the storage device 6 when the data stream was received at analyzer 30, an indication of an amount of available memory of the mass storage device of the of storage device 6, or any other data about the state of storage device 6.

In some examples, analyzer 30 may cause the debugging data (e.g., including the appended data) to be stored at storage device 6. For instance, analyzer 30 may include dedicated memory (e.g., SRAM, DRAM, NVM, etc.) which analyzer 30 may use to store the debugging data. In other instances, analyzer 30 may send the debugging data to controller 8 for storing the debugging data at NVM 10 or volatile memory 12. In this way, storage device 6 may retain a copy of the debugging data for sending to host device 4 at a later time.

Analyzer 30 may send the debugging data (e.g., including the appended data) to host device 4 via interface 14. For instance, analyzer 30 may output the debugging data to port 50 of interface 14, which may transmit the debugging data to host device 4. In some examples, host device 4 may include additional software to summarize or further analyze the debugging data. For example, host device 4 may receive the debugging data and may summarize the debugging data or generate reports that provide a user with information about the data transfer and the state of storage device 6. In some instances, the software included in host device 4 may enable a user to view the debugging data at different levels of granularity. For instance, host device 4 may summarize the debugging data and may enable a user to expand on the summary to produce view additional details. In this way, host device 4 may assist a user in debugging storage environment 2.

In this manner, storage device 6 may split an electrical signal 21A representative of data received from a host device 4. By splitting the electrical signal 21A representative of data into two or more electrical signals representative of two identical data streams, the storage device may transmit a first data stream 21B to a controller 8 for processing read and write commands and a second data stream 21C to an analyzer 30. Thus, in contrast to techniques that utilize an interposer card to intercept electrical signals, the storage device 6 may transmit data to the controller with minimal disruption while enabling an analyzer 30 to analyze the second data stream 21C. By embedding an analyzer 30 within the storage device 6, the techniques of this disclosure may enable a storage device 6 to analyze a data transfer in real-time and may provide data about the storage device 6 in addition to the data transfer itself. By providing information about the storage device in addition to information about the data transfer, analyzer 30 may provide a more complete representation of the state of storage environment 2 to assist a user when debugging storage environment 2.

While analyzer 30 is described in the context of a storage device, analyzer 30 may be included in any endpoint device configured to exchange data with a host device over an interface protocol (e.g., PCIe®). For example, analyzer 30 may be embedded within an endpoint device such as a graphics card, a communication device (e.g., Ethernet, WiFi, Bluetooth®, etc.), a TV tuner, an audio/video (A/V) input/output card, USB™ port, memory card reader, or any other type of endpoint device that be connected to host device 4 via an interface protocol.

In some examples, analyzer 30 may be embedded within host device 4. For example, a host device may receive an electrical signal representative of data from an endpoint device and may split the electrical signal into a plurality of data streams. Host device 4 may filter the received data streams to generate debugging data, append data about the data transfer or host device 4 to the debugging data, and may store the debugging data at host memory 46. in this way, host device 4 may output the debugging data to assist a user in debugging storage environment 2.

Figure 2:
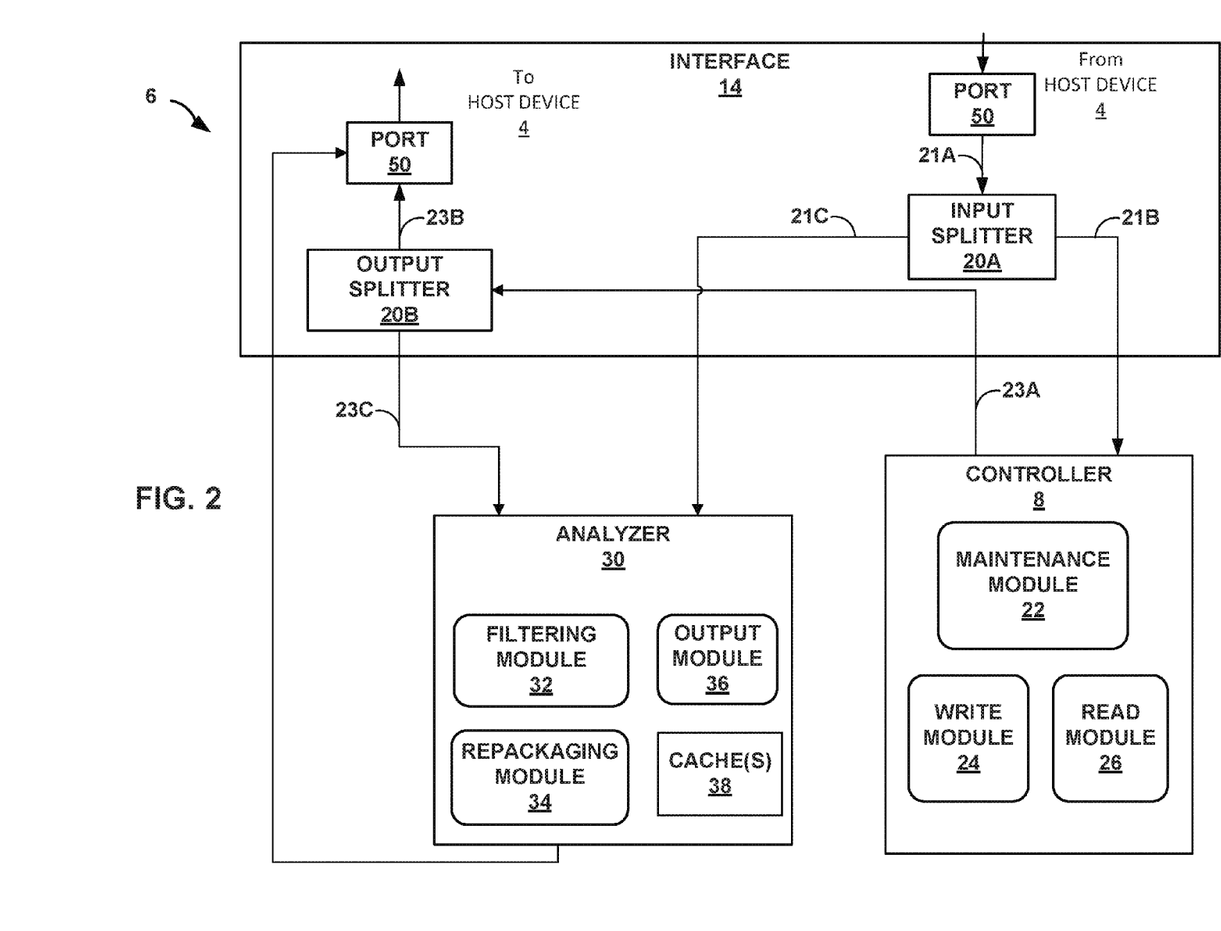
FIG. 2 is a conceptual and schematic block diagram illustrating further details of an example storage device configured to analyze data transferred between the storage device and a host device, in accordance with one or more techniques of this disclosure.

FIG. 2 is a conceptual and schematic block diagram illustrating further details of an example storage device 6 configured to analyze data transferred between the storage device 6 and a host device (e.g., host device 4 of FIG. 1), in accordance with one or more techniques of this disclosure. In some examples, storage device 6 may include controller 8, interface 14, and analyzer 30.

Controller 8 may manage the storage of data to, and the retrieval of data from, NVM 10. In some examples, controller 8 may include maintenance module 22, write module 24, and read module 26. Maintenance module 24 may be configured to perform operations related to maintaining performance and extending the useful life of storage device 6 (e.g., NVM 10). For example, maintenance module 24 may implement at least one of wear leveling or garbage collection. Write module 24 may manage write operations to NVM 10 and/or volatile memory 12. Similarly, read module 26 may manage the read operations from NVM 10 and/or volatile memory 12. In other examples, controller 8 may include additional modules or hardware units, or may include fewer modules or hardware units. Controller 8 may include a microprocessor, digital signal processor (DSP), application specific integrated circuit ASIC), field programmable gate array (FPGA), or other digital logic circuitry. In some examples, controller 8 may be a system on a chip (SoC).

In some examples, controller 8 may receive data from host device 4 (via interface 14) and may send data to host device 4 (via interface 14). For example, controller 8 may receive a write command from host device 4 and write module 24 may write data indicated by the write command to NVM 10. In response to writing the data to NVM 10, write module 24 of controller 8 may output, to host device 4 via interface 14, an indication that the write operation is complete. Similarly, controller 8 may receive a read command from host device 4 and read module 26 may retrieve data from NVM 10. In response to retrieving the data from NVM 10, read module 26 of controller 8 may output, to host device 4 via interface 14, the data indicated by the read command.

As illustrated in FIG. 2, in some examples, interface 14 includes a single port 50, input splitter 20A, and output splitter 20B. In some examples, storage device 4 may send data to, and may receive data from, host device 4 by exchanging electrical signals representative of data over port 50. Storage device 6 may receive an electrical signal representative of data from host device 4 at port 50, split the electrical signal at input splitter 20A into a plurality electrical signals, and output a plurality of identical data streams represented by the plurality of electrical signals. For example, input splitter 20A may receive an electrical signal 21A representative of data and may split received electrical signal 21A into a first data stream 21B and a second data stream 21C. Input splitter 20A may be electrically coupled to controller 8 and may output the first data stream 21B to controller 8. Similarly, input splitter 20A may be electrically coupled to analyzer 30 and may output the second data stream 21C to analyzer 30. In some examples, output splitter 20B of interface 14 receive an electrical signal representative of data from controller 8 and may split the electrical signal received from controller 8 into a plurality of identical data streams. For example, output splitter 20B may receive electrical signal 23A representative of data from controller 8, split the received electrical signal 23A into a third data stream 23B and a fourth data stream 23C. Output splitter 20B may be electrically coupled to host device 4 (via port 50) and analyzer 30 and may output the third data stream 23B to host device 4 and the fourth data stream 23C to analyzer 30.

In some examples, input splitter 20A and/or output splitter 20B may split every electrical signal received at the respective splitters 20. However, in other examples, storage device 6 may determine whether to split the electrical signals received at interface 14 (e.g., electrical signals received from host device 4 and/or controller 8). For example, each splitter of splitters 20 may include a switch that can be opened to prevent a data stream from flowing to analyzer 30 or can be closed to enable a data to flow to analyzer 30. For instance, if input splitter 20A receives an electrical signal representative of data and the switch is open, input splitter 20A may output the first data stream to controller 8 and may not output any data to analyzer 30. However, if the switch is closed, input splitter 20A may output a first data stream to controller 8 and may output a second data stream to analyzer 30.

In some instances, storage device 6 may determine whether to split the electrical signal representative of data that is received at interface 14 based on a command from host device 4. In other words, storage device 6 may cause at least one of input splitter 20A or output splitter 20B to selectively split the received electrical signal representative of data in response to receiving a particular command from host device 4. For instance, host device 4 may send a command to storage device 6 to activate analyzer 30, such that storage device 6 may cause at least one of input splitter 20A or output splitter 20B to split the received electrical signal representative of data.

In some instances, storage device 6 may determine whether to split the electrical signal representative of data that is received at interface 14 based on detecting an error in a data transfer between host device 4 and storage device 6. In other words, storage device 6 may cause at least one of input splitter 20A or output splitter 20B to selectively split the received electrical signal representative of data in response to storage device 6 detecting an error in a data transfer between host device 4 and storage device 6. For instance, interface 14 of storage device 6 may detect that data received from host device 4 is corrupt and may cause at least one of input splitter 20A or output splitter 20B to split the received electrical signal representative of data.

Storage device 6 may, in some examples, determine whether to split the electrical signal representative of data that is received at interface 14 based on the state of storage device 6. For example, storage device 6 may cause input splitter 20A and/or output splitter 20B to split a received signal when a temperature of storage device 6 is greater than a threshold temperature, when a queue internal to storage device 6 contains more than a threshold amount of data, when an operation (e.g., read, write, garbage collection, wear leveling, etc.) of storage device 6 starts, stops, or reaches a threshold completion level, when a particular function is called, to name only a few examples. Storage device 6 may determine whether to split the electrical signal representative of data in response to any number of other events, such as receiving a particular type of data packet or data frame, receiving a transmission error negative-acknowledgement (nak), detecting a particular sequence of events, etc.

In some instances, if storage device 6 determines not to split the electrical signal representative of the received data, storage device 6 may output the data represented by the received electrical signal to controller 8. In this way, controller 8 may receive the data represented by the received electrical signal, regardless of whether analyzer 30 is active. In this way, controller 8 may perform operations associated with the data (e.g., reading data from, or writing data to, NVM 10).

Analyzer 30 may receive a data stream from input splitter 20A or output splitter 20B and may analyze the data stream. As illustrated in FIG. 2, analyzer 30 may include a filtering module 32, repackaging module 34, output module 36, and one or more caches 38. In some examples, the one or more caches 38 may include a volatile or non-volatile memory device. The functionality of analyzer 30 may be implemented in a microprocessor, digital signal processor (DSP), application specific integrated circuit (ASIC), field programmable gate array (FPGA), or other digital logic circuitry.

Filtering module 32 may filter the received data stream in order to generate debugging data. Filtering module 32 may filter the received data stream based on a set of one or more criterion. In some examples, the set of one or more criterion may be predetermined. For example, the set of one or more criterion may be hard coded into a hardware circuit, firmware, or software. For instance, cache 38 may be preprogrammed with a set of one or more criterion. In other examples, the set of one or more criterion may not be predetermined. For example, analyzer 30 may receive the set of one or more criterion from host device 4 and may be store the set of one or more criterion at cache 38.

In some instances, filtering module 32 may retrieve the set of one or more criterion from cache 38 (e.g., regardless of whether the set of criterion is predetermined or not) and may filter the received data stream based on the one or more criterion. For instance, filtering module 32 may capture, from the received data stream, data that meets at least one criterion from the set of one or more criterion and may disregard data that does not meet at least one criterion.

In some examples, filtering module 32 may receive a data stream that includes one or more data packets and may filter the received data stream by capturing certain types of data packets (e.g., TLPs, DLLPs, or ordered sets). In other words, the set of one or more criterion may identify certain types of data packets to be included in the debugging data and filtering module 32 may capture or select data packets that match the types of data packets identified by the set of criterion.

In other examples, filtering module 32 may filter the received data stream by capturing certain portions of a data packet (e.g., certain fields in a header of a data packet, such as a command type, requester ID, packet length, payload length, etc.). In other words, the set of one or more criterion may identify certain portions of a data packet to be included in the debugging data and filtering module 32 may capture or select the portions of a data packet that match the portions identified in the set of criterion. By receiving a data stream and capturing the data that matches at least one criterion from the set of one or more criterion, filtering module 32 may generate debugging data and may output the debugging data to repackaging module 34.

Repackaging module 34 may receive the debugging data from filtering module 32 and may append additional data to the debugging data. In some examples, repackaging module 34 may append, to the debugging data, metadata associated with the data stream received by analyzer 30. In some instances, the metadata may include a timestamp corresponding to a time at which the data stream was received by the analyzer, which may also correspond to a time at which an electrical signal representative of the data stream was received at interface 14. In some instances, the metadata may include a source identifier indicating a source of the data stream received by analyzer 30, which may indicate whether the data is being sent to host device 4 or was received from host device 4. In some instances, the metadata may include a port identifier indicating a port of interface 14 to use for sending the debugging data to host device 4.

In some examples, repackaging module 34 may append data associated with storage device 6 to the debugging data. For example, repackaging module 34 may append data about the state of storage device 6 at the time the data stream was received by analyzer 30, which may correspond to the state of storage device 6 at the time the electrical signal representative of the data stream was received at interface 14.

In some instances, the data associated with the state of storage device 6 may include a status identifier indicating whether the storage device was performing internal operations (e.g., garbage collection, wear leveling, defragmenting, etc.) when the second data stream was received. In some instances, the data associated with the state of storage device 6 may include an operations identifier that indicates which internal operations were being performed when the second data stream was received. In still other instances, the data associated with the state of storage device 6 may include an indication of the amount of available memory of the mass storage device (e.g., NVM 10) of storage device 6 when the second data steam was received. In some examples, repackaging module 34 may compress the debugging data prior to storing or outputting the debugging data.

Repackaging module 34 may, in some examples, temporarily store the debugging data in cache 38. In some instances, repackaging module 34 may store the filtering criterion in a first cache 38 and the debugging data in a second cache 38.

Output module 36 may send at least a portion of the debugging data to host device 4 (e.g., via port 50 of interface 14). In some examples, output module 36 may send all of the debugging data to host device 4. In some examples, output module 36 may send only a portion of the debugging data to host device 4. For example, output module 36 may generate a subset of the debugging data and may send the subset of the debugging data to host device 4.

In some examples, output module 36 may generate a subset of the debugging data in response to a trigger. In some examples, a trigger may be associated with a data transfer between host device 4 and storage device 6, such an error in a data transfer between host device 4 and storage device 6, a particular command from host device 4, a particular type of data packet or data frame, a transmission error nak, a particular sequence of events, or any other type of trigger. The trigger may, in some examples, be associated with the state of storage device 6. For example, the trigger may occur when the temperature of storage device 6 is greater than a threshold temperature, when a queue internal to storage device 6 contains more than a threshold amount of data, when an operation (e.g., read, write, garbage collection, wear leveling, etc.) of storage device 6 starts, stops, or reaches a threshold completion level, or when a particular function is called, to name only a few examples. in contrast to examples where an analyzer is physically separate from storage device 6, integrating analyzer 30 into storage device 6 may enable analyzer 30 to send debugging data to host device 4 in response to a trigger associated with the state of storage device 6.

In some examples, the subset of debugging data may be defined by a capture window associated with the trigger. The capture window may include a predefined timespan before, during, and/or after the time at which the trigger occurs. In other words, when a trigger occurs, output module 36 may generate a subset of the debugging data by retrieving, from cache 38, the portion of the debugging data that was generated within a predefined amount of time from when the trigger occurred. In some instances, a first type of trigger may be associated with a first capture window and a second type of trigger may be associated with a second, different capture window.

Output module 36 may retrieve all of the debugging data or a subset of the debugging data from cache 38 and may determine whether to send the debugging data to host device 4. In some examples, output module may determine whether to send the debugging data to host device 4 based on the status of interface 14. For example, output module 36 may receive an indication that non-debugging data is not currently being sent to host device 4 or an indication of the amount of non-debugging data being sent to host device 4. For instance, interface 14 may output an indication that an outbound PCIe® link of interface 14 is not currently being used or an indication of the amount of non-debugging data currently being transferred. When interface 14 is not currently transferring non-debugging data to host device 4 or the amount of non-debugging data is less than a threshold amount of data, analyzer 30 may send the debugging data to host device 4 without affecting (or with minimal affect to) the throughput of non-debugging data over interface 14. Output module 36 may determine, based on the indication from interface 14, whether the amount of non-debugging data currently being sent to host device 4 is less than a threshold amount of data. In response to determining that the amount of non-debugging data currently being sent to host device 4 is less than the threshold amount of data, output module 36 may output the debugging data (e.g., including the additional data appended by repacking module 34) to host device 4 via interface 14.

In some examples, in response to determining that the amount of non-debugging data currently being sent to host device 4 is greater than a threshold amount of data, output module 36 may determine that storage device 6 should store the debugging data rather than sending the debugging data to host device 4. As a result, in some instances, output module 36 may store the debugging data to a memory (e.g., NVM 10, volatile memory 12, or a third cache 38). In some examples, after storing the debugging data to a memory, output module 36 may receive a second indication of the amount of non-debugging data being sent to host device 4 and may determine whether the amount of non-debugging data being transferred between host device 4 and storage device 6 is less than a threshold amount of data. In response to determining that the amount of non-debugging data being transferred between host device 4 and storage device 6 has decreased and is less than a threshold amount of data, output module 36 may retrieve the debugging data from memory (e.g., NVM 10, volatile memory 12, or a third cache 38) and may send the debugging data to host device 4 via interface 14.

Figure 3:
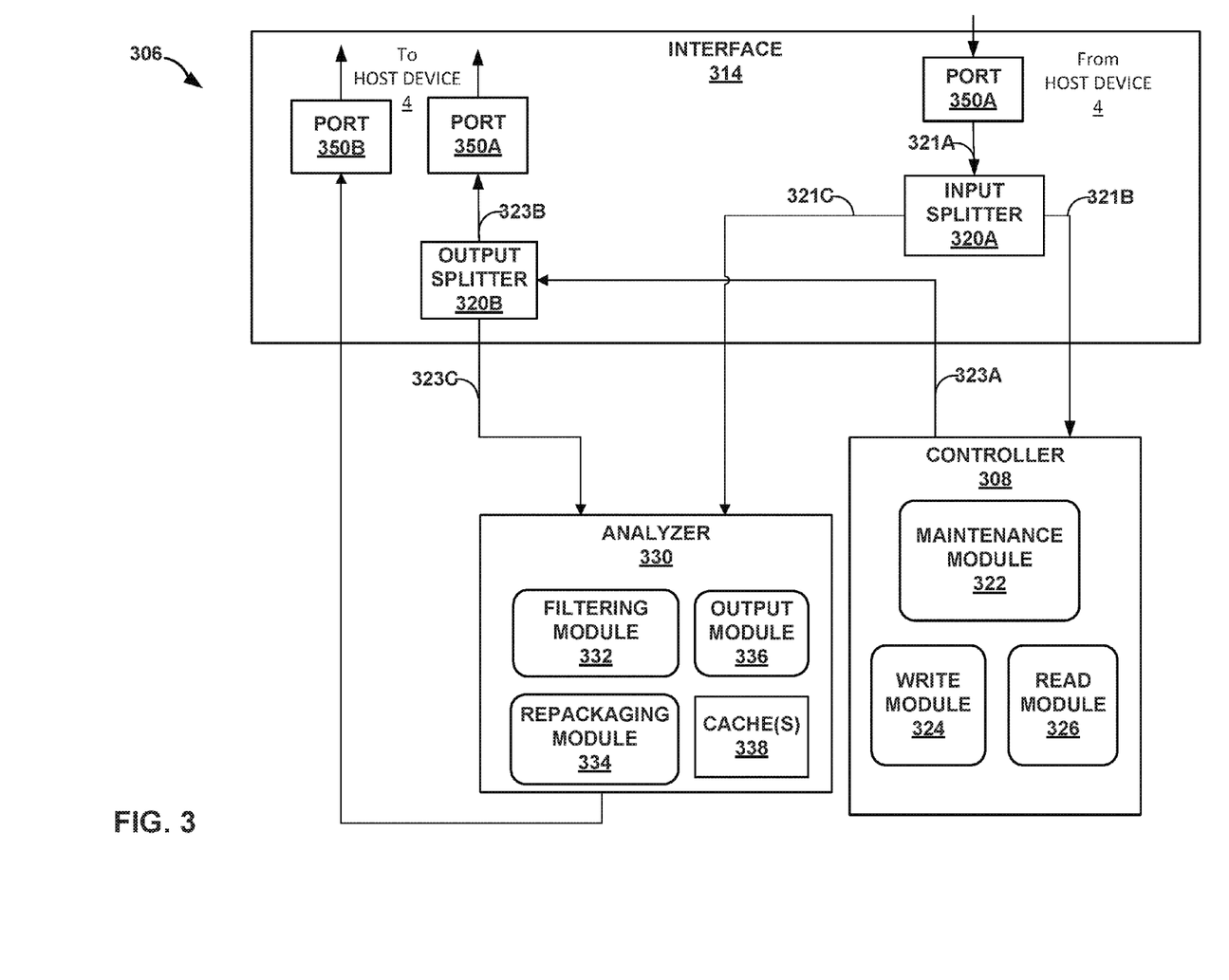
FIG. 3 is a conceptual and schematic block diagram illustrating further details of an example storage device configured to analyze data transferred between a storage device and a host device, in accordance with one or more techniques of this disclosure.

FIG. 3 is a conceptual and schematic block diagram illustrating further details of an example storage device 306 configured to analyze data transferred between the storage device 306 and a host device (e.g., host device 4 of FIG. 1), in accordance with one or more techniques of this disclosure. In some examples, storage device 306 may include controller 308, interface 314, and analyzer 330. Controller 308 may include maintenance module 322, write module 324, and read module 326, which may correspond to the controller 8, maintenance module 22, write module 24, and read module 26 of FIG. 2, respectively. Similarly, analyzer 330 may include filtering module 332, repackaging module 334, output module 336, and cache 338, which may correspond to analyzer 30, filtering module 32, repackaging module 34, output module 36, and cache 38 of FIG. 2, respectively.

As illustrated in FIG. 3, in some examples, interface 314 includes a plurality of ports and a plurality of signal splitters. For instance, interface 31.4 may include Port 350A and Port 350B (collectively ports 350). Interface 314 may receive an electrical signal 321A representative of data from host device 4 via port 350A and may split the electrical signal 321A into a plurality of electrical signals, and may output a plurality of identical data streams represented by the electrical signals. For instance, input splitter 320A may output a first data stream 321B to controller 308 and may output a second data stream 321C to analyzer 330. In some examples, output splitter 320B of interface 14 may receive an electrical signal representative of data from controller 308 and may output a third data stream 323B to host device 4 and output a fourth data stream 323C to analyzer 330.

Analyzer 330 may receive a data stream from either input splitter 320A or output splitter 320B and may analyze the data stream in a manner similar to analyzer 30, as described with reference to FIGS. 1 and 2. For instance, filtering module 332 may filter the received data stream based on a set of one or more criterion. In some examples, the set of one or more criterion may be predetermined. In other examples, the set of one or more criterion may be received from host device 4. The set of one or more criterion may specify a type of packets within the received data stream to be captured by filtering module 332. The set of one or more criterion may specify a portion of a data packet to be captured by filtering module 332. Filtering module 332 may compare the received data stream to the set of one or more criterion and may generate debugging data by capturing the data from the received data stream that matches at least one criterion from the set of one or more criterion.

Repackaging module 334 may receive the debugging data from filtering module 332 and may append additional data to the debugging data. In some examples, repackaging module 334 may append metadata associated with the received data stream to the debugging data. In other examples, repackaging module 334 may append data associated with the state of storage device 306 to the debugging data. As illustrated in FIG. 3, output module 336 may output the debugging data to host device via port 350B, which may be dedicated for the debugging data. By outputting the debugging data over one port (e.g., port 350B) and outputting the non-debugging data over a different port (e.g., port 350A), storage device 306 may transmit the debugging data to host device 4 without affecting the throughput of the non-debugging data.

Figure 4:
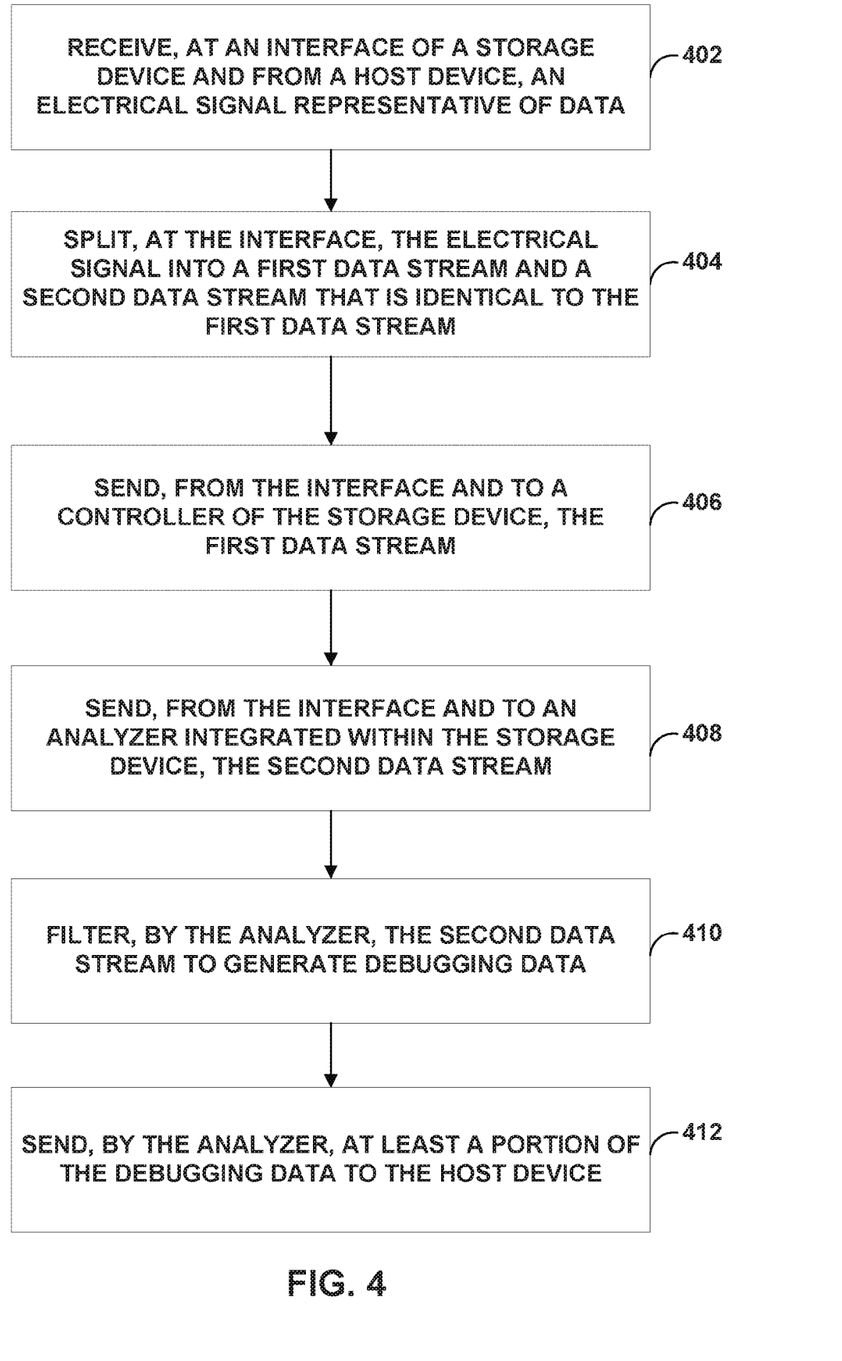
FIG. 4 is a flow diagram illustrating an example technique for analyzing a data transfer between a host device and a storage device, in accordance with one or more techniques of this disclosure.

FIG. 4 is a flow diagram illustrating an example technique for analyzing a data a data transfer between a host device and a storage device 6, in accordance with one or more techniques of this disclosure. For ease of illustration, the technique of FIG. 4 will be described with concurrent reference to storage device 6 of FIGS. 1-2 and storage device 306 of FIG. 3. However, the techniques may be used with any combination of hardware or software.

Storage device 6 may receive, from host device 4, an electrical signal representative of data at interface 14 (402). For example, host device 4 may send data to storage device 6 by transmitting electrical signals representative of the data being sent. In some instances, storage device 6 may split the electrical signal into a first data stream and a second data stream at the interface (404). For instance, interface 14 of storage device 6 may include one or more signal splitters 20. Each signal splitter of signal splitters 20 may receive an electrical signal representative of data, split the signal into a plurality of electrical signals, and output a plurality of identical data streams represented by the plurality of identical signals. For instance, input splitter 20A of interface 14 may receive an electrical signal 21A representative of data from host device 4 and may output a first data stream 21 B and a second data stream 21C.

In some examples, storage device 6 may send the first data stream from the interface to a controller of storage device 6 (406). For example, input splitter 20A may be electrically coupled to controller 8 and may output first data stream 21B to controller 8. In some examples, storage device 6 may send the second data stream from the interface to an analyzer integrated within the storage device (408). For example, input splitter 20A may be electrically coupled to analyzer 30 and may output second data stream 21C to analyzer 30.

Analyzer 30 may filter the second data stream 21C to generate debugging data (410). In some instances, analyzer 30 may filter the second data stream 21C by capturing certain types of data packets in the second data stream 21C, or by capturing certain portions of a data packet in the second data stream 21C. Analyzer 30 may filter data stream 21C based on a set of one or more criterion. In some instances, analyzer 30 may receive at least one criterion from host device 4 and may store the criterion in memory (e.g., cache 38). In some instances, at least one criterion may be predetermined. For instance, at least one of the criterion may be hardcoded in hardware, firmware, or software. Analyzer 30 may generate debugging data by capturing or selecting the data from data stream 21C that matches at least one criterion from the set of one or more criterion.

Analyzer 30 may send at least a portion of the debugging data to host device 4 (412). In some examples, analyzer 30 may send all of the debugging data to host device 4. In other examples, analyzer 30 may generate a subset of the debugging data based on a trigger and may send the subset of the debugging data to host device 4. In some instances, interface 14 may include a single port such that analyzer 30 may send the debugging data (e.g., all of the debugging data or the subset of debugging data) to host device 4 via the same port as non-debugging data. In some examples, interface 14 may include a plurality of ports, such as ports 350A and 350B of FIG. 3. At least one port 350B of the of the plurality of ports may be dedicated for transmitting debugging data while the remaining ports may be used to transfer non-debugging data between host device 4 and storage device 6.

Figure 5:
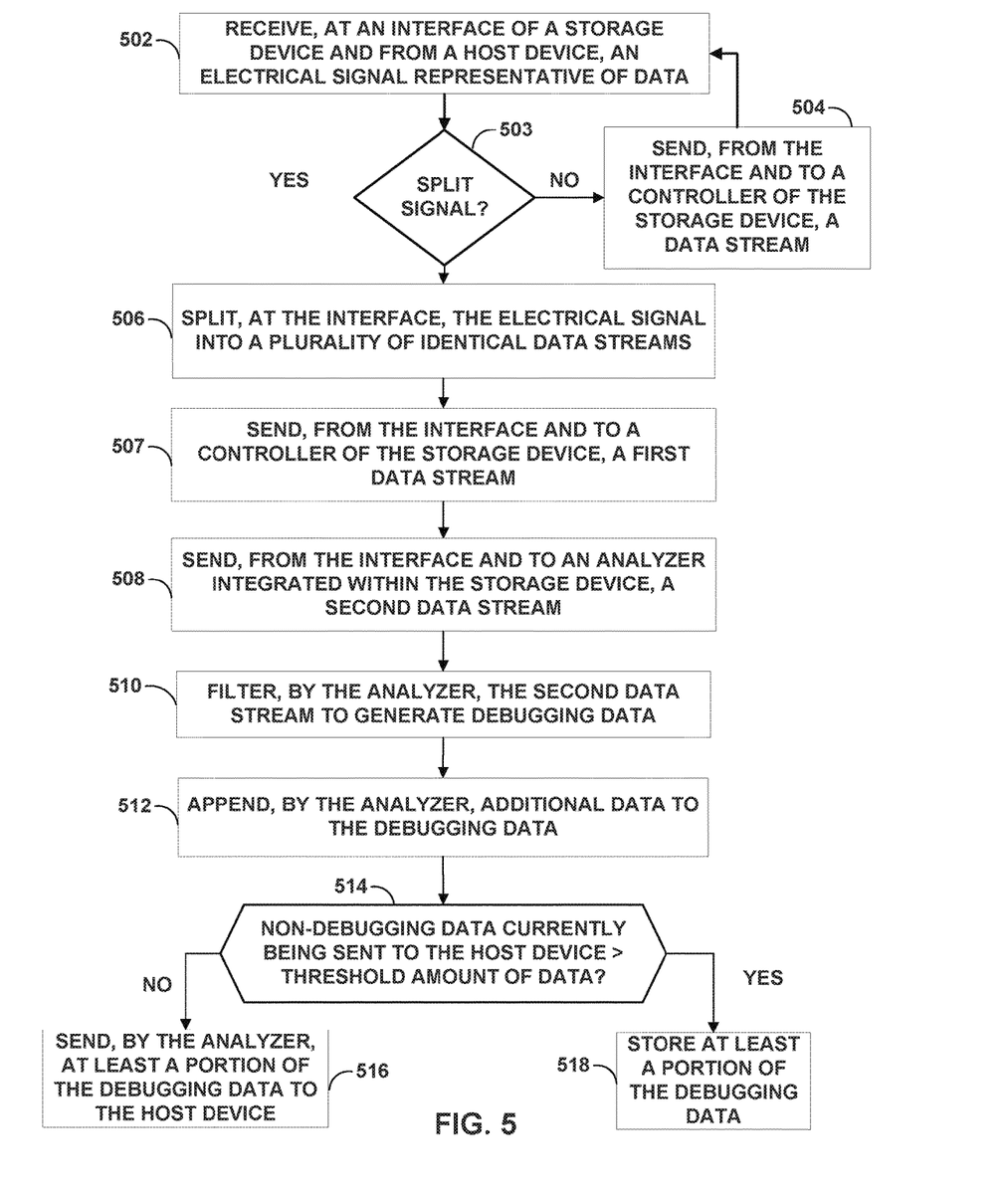
FIG. 5 is a flow diagram illustrating an example technique for analyzing a data transfer between a host device and a storage device, in accordance with one or more techniques of this disclosure.

FIG. 5 is a flow diagram illustrating an example technique for analyzing a data a data transfer between a host device and a storage device 6, in accordance with one or more techniques of this disclosure. For ease of illustration, the technique of FIG. 5 will be described with concurrent reference to storage device 6 of FIGS. 1-2 and storage device 306 of FIG. 3. However, the techniques may be used with any combination of hardware or software.

Storage device 6 may receive, from host device 4, an electrical signal representative of data at interface 14 (502). For example, host device 4 may send data to storage device 6 by transmitting electrical signals representative of the data being sent. In some examples, storage device 6 may determine whether to split the electrical signal representative of the data (503). For example, storage device 6 may receive a command from host device 4 to activate analyzer 30 and may determine to split the received electrical signal in response to receiving the command to activate analyzer 30. As another example, storage device 6 may determine to split the received electrical signal in response to detecting an error in a data transfer between host device 4 and storage device 6.

In response to determining not to split the received electrical signal (503, NO path), interface 14 of storage device 6 may output a data stream represented by the electrical signal to controller 8 of storage device 6 (504). In this way, controller 8 may receive the data represented by the received electrical signal and may perform operations associated with the data (e.g., controller 8 may execute read and/or write commands).

In response to determining to split the received electrical signal 21A representative of the data (503, YES path), input splitter 20A of interface 14 may split the electrical signal 21A into a first data stream 21B and a second data stream 21C (506). For instance, interface 14 of storage device 6 may include one or more signal splitters 20. Each signal splitter of signal splitters 20 may receive an electrical signal representative of data and split the signal into a plurality of electrical signals. For instance, storage device 6 may close a switch in input splitter 20A which may enable data to flow from input splitter 20A to analyzer 30 in addition to controller 8. Thus, input splitter 20A may output a plurality of identical data streams represented by the plurality of identical signals. For instance, input splitter 20A of interface 14 may send a first data stream 21B to controller 8 (507) and may send a second data stream 21C to analyzer 30 (508). In this way, controller 8 may receive a first data stream 21B and may execute operations associated with the first data stream (e.g., read and/or write commands), while analyzer 30 may receive a second data stream 21C to analyze the data transfer.

Analyzer 30 may filter the second data stream 21C to generate debugging data (510). In some instances, analyzer 30 may filter the second data stream 21C by capturing certain types of data packets in the second data stream 21C, or by capturing certain portions of a data packet in the second data stream 21C. Analyzer 30 may filter data stream 21C based on a set of one or more criterion. In some instances, analyzer 30 may receive at least one criterion from host device 4 and may store the criterion in memory (e.g., cache 38). In some instances, at least one criterion may be predetermined. For instance, at least one of the criterion may be hardcoded in hardware, firmware, or software. Analyzer 30 may generate debugging data by capturing or selecting the data from data stream 21C that matches at least one criterion from the set of one or more criterion.

Analyzer 30 may append additional data to the debugging data (512). In some examples, analyzer 30 may append metadata associated with the second data stream 21C that is received by analyzer 30. For example, analyzer 30 may append a timestamp corresponding to a time at which the second data stream 21C was received at analyzer 30, a source identifier indicating a source (e.g., host device 4 or controller 8) of the second data stream (e.g., input splitter 20A, which may indicate the source is host device 4; or output splitter 20B, which may indicate the source is controller 8), or a port identifier indicating a port of interface 14 to use when sending the debugging data to host device 4. In some examples, analyzer 30 may append data associated with storage device 6 to the debugging data. For example, analyzer 30 may append data about the state of storage device 6 when the analyzer 30 received the second data stream 21C. For instance, the data about the state of storage device 6 may include a status identifier that indicates whether storage device 6 was performing internal operations when the data stream was received at analyzer 30, an operations identifier that indicates which internal operations were being performed when the data stream was received at analyzer 30, an indication of a temperature of the storage device 6 when the data stream was received at analyzer 30, or an indication of an amount of available memory of the mass storage device of the of storage device 6.

In some examples, analyzer 30 may determine whether the amount of non-debugging data currently being sent from storage device 6 to host device 4 is greater than a threshold amount of data (514). For example, analyzer 30 may receive an indication from interface 14 that indicates whether interface 14 is current sending non-debugging data to host device 4 or indicates an amount of non-debugging data currently being transferred to host device 4. Analyzer 30 may determine whether to send the debugging data to host device 4 based on the indication received from interface 14. For example, if analyzer 30 determines that the amount of non-debugging data being sent to host device 4 is greater than a threshold amount of data (514, YES path), analyzer 30 may store at least a portion of the debugging data to memory (e.g., cache 38, NVM 10, volatile memory 12) (518). For example, analyzer 30 may store all of the debugging data to a memory or may generate a subset of the debugging data and may store the subset of the debugging data to the memory. In response to storing the debugging data (e.g., all of the debugging data or the subset of the debugging data) to memory, analyzer 30 may periodically re-determine whether the amount of non-debugging data currently being sent by interface 14 to host device 4 is less than a threshold amount of data. In response to determining that the amount of non-debugging data currently being sent is less than the threshold, analyzer 30 may retrieve the stored debugging data from memory and send the debugging data to host device 4.

In some examples, in response to determining that the amount non-debugging data currently being sent to host device 4 is less than a threshold amount of data (514, NO path), analyzer 30 may send the debugging data (e.g., all of the debugging data or a subset of the debugging data) to host device 4 (516). By waiting to send the debugging data until the amount of non-debugging data being sent to host device 4 is less than a threshold amount of data, analyzer 30 may reduce or eliminate any effects on throughput that may be caused by transmitting the debugging data to host device 4.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, at an interface of a storage device and from a host device, an electrical signal representative of data, wherein the storage device comprises a mass storage device;
   splitting, at the interface, the electrical signal representative of the data into a first data stream and a second data stream, wherein the first data stream is identical to the second data stream;
   sending, from the interface and to a controller of the storage device, the first data stream;
   sending, from the interface and to an analyzer integrated within the storage device, the second data stream;
   filtering, by the analyzer, the second data stream to generate debugging data; and
   sending, by the analyzer and to the host device, at least a portion of the debugging data.

2. The method of claim 1, further comprising:
   appending, by the analyzer, to the debugging data, metadata associated with the second data stream, wherein the metadata associated with the second data stream comprises at least one of any of the following:
   a timestamp corresponding to a time at which the second stream of data was received by the analyzer,
   a source identifier indicating a source of the second data stream, or
   a port identifier indicating a port of the interface to use for sending the portion of the debugging data to the host device.

3. The method of claim 1, further comprising appending, by the analyzer, to the debugging data, data associated with the storage device, wherein the data associated with the storage device comprises at least one of any of the following:
   a status identifier indicating whether the storage device was performing internal operations when the second data stream was received,
   an operations identifier indicating which internal operations were being performed when the second data stream was received, or
   an indication of an amount of available memory of the mass storage device when the second data steam was received.

4. The method of claim 1, further comprising generating, by the storage device, a subset of the debugging data in response to a trigger,
   wherein the subset of the debugging data comprises debugging data generated within a predefined timespan of a time at which the trigger occurred, and
   wherein sending at least a portion of the debugging data comprises sending the subset of the debugging data.

5. The method of claim 4, wherein the trigger is associated with the state of the storage device.

6. The method of claim 1, further comprising receiving, by the storage device and from the host device, one or more filter criterion, wherein filtering the second data stream comprises filtering the second data stream based at least in part on the one or more filter criterion received from the host device.

7. The method of claim 1, wherein filtering the second data stream comprises filtering the second data stream based at least in part on one or more predetermined filter criterion.

8. The method of claim 1, further comprising storing, by the storage device and at a memory device of the storage device, the debugging data.

9. The method of claim 8, further comprising:
determining, by the storage device, whether non-debugging data is currently being transferred between the storage device and the host device; and
in response to determining that non-debugging data is not currently being transferred between the storage device and the host device, retrieving the debugging data from the memory device,
wherein sending the portion of the debugging data from the storage device and to the host device comprises sending the portion of the debugging data in response to retrieving the portion of the debugging data from the memory device.

10. The method of claim 1, wherein the interface of the storage device includes a first port and a second port, wherein receiving the electrical signal indicative of the data stream comprises receiving the electrical signal indicative of the data stream via the first port, and wherein sending the portion of the debugging data comprises sending the portion of the debugging data via the second port.

11. A data storage device comprising:
a mass storage device;
a controller that manages read operations from the mass storage device and write operations to the mass storage device;
an interface comprising at least one signal splitter; and
an analyzer,
wherein the signal splitter:
receives, from a host device, an electrical signal representative of data;
splits, the electrical signal representative of the data into a first data stream and a second data stream, wherein the first data stream is identical to the second data stream;
sends, to the controller, the first data stream; and
sends, to the analyzer, the second data stream;
wherein the analyzer:
filters the second data stream to generate debugging data; and
sends, to the host device via the interface, at least a portion of the debugging data.

12. The data storage device of claim 11, wherein the analyzer appends, to the debugging data, metadata associated with the second data stream,
wherein the metadata associated with the second data stream comprises at least one of any of the following:
a timestamp corresponding to a time at which the second stream of data was received by the analyzer,
a source identifier indicating a source of the second data stream, or a port identifier indicating a port of the interface to use for sending the portion of the debugging data to host device.

13. The data storage device of claim 11, wherein the analyzer appends, to the debugging data, data associated with the storage device, wherein the data associated with the storage device comprises at least one of any of the following:
a status identifier indicating whether the storage device was performing internal operations when the second data stream was received,
an operations identifier indicating which internal operations were being performed when the second data stream was received, or an indication of an amount of available memory of the mass storage device when the second data steam was received.

14. The data storage device of claim 11, wherein the analyzer generates a subset of the debugging data in response to a trigger, and
wherein the subset of the debugging data comprises debugging data generated within a predefined timespan of a time at which the trigger occurred, and
wherein the analyzer sends at least the portion of the debugging data by sending, to the host device, the subset of the debugging data.

15. The data storage device of claim 14, wherein the trigger is associated with the storage device.

16. The data storage device of claim 11, wherein the interface receives, from the host device, one or more filter criterion, wherein the analyzer filters the second data stream based at least in part on the one or more filter criterion received from the host device.

17. The data storage device of claim 11, wherein the analyzer filters the second data stream based at least in part on one or more predetermined filter criterion.

18. The data storage device of claim 11, wherein the analyzer stores, at a memory device of the storage device, the debugging data.

19. The data storage device of claim 18, wherein the analyzer:
determines whether non-debugging data is currently being transferred between the storage device and the host device; and
in response to determining that non-debugging data is not currently being transferred between the storage device and the host device, retrieves the portion of the debugging data from the memory device,
wherein the analyzer sends the portion of the debugging data in response to retrieving the portion of the debugging data from the memory device.

20. An endpoint device comprising:
a controller;
an interface comprising a signal splitter; and
an analyzer,
wherein the signal splitter:
receives, from a host device, an electrical signal representative of data;
splits, the electrical signal representative of the data into a first data stream and a second data stream, wherein the first data stream is identical to the second data stream;
sends, to the controller, the first data stream; and
sends, to the analyzer, the second data stream;
wherein the analyzer:
filters the second data stream to generate debugging data; and
sends, to the host device via the interface, at least a portion of the debugging data.

* * * * *